(12) United States Patent
Nakahara et al.

(10) Patent No.: US 9,013,668 B2
(45) Date of Patent: Apr. 21, 2015

(54) LIQUID CRYSTAL DISPLAY PANEL AND METHOD FOR PRODUCING THE SAME

(75) Inventors: Hijiri Nakahara, Osaka (JP); Tsuyoshi Okazaki, Osaka (JP); Shogo Nishiwaki, Osaka (JP); Mitsunori Harada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 113 days.

(21) Appl. No.: 13/883,284

(22) PCT Filed: Nov. 4, 2011

(86) PCT No.: PCT/JP2011/075370
§ 371 (c)(1),
(2), (4) Date: May 3, 2013

(87) PCT Pub. No.: WO2012/063719
PCT Pub. Date: May 18, 2012

(65) Prior Publication Data
US 2013/0222725 A1    Aug. 29, 2013

(30) Foreign Application Priority Data
Nov. 11, 2010 (JP) ................................. 2010-253221

(51) Int. Cl.
*G02F 1/1339*    (2006.01)
*G02F 1/1333*    (2006.01)

(52) U.S. Cl.
CPC ........ *G02F 1/133345* (2013.01); *G02F 1/1333* (2013.01); *G02F 1/1339* (2013.01)

(58) Field of Classification Search
CPC ......... G02F 1/00; H01L 27/12; G02B 5/0808; G03F 7/425
USPC .................... 349/39, 113, 114, 323, 329, 153
See application file for complete search history.

(56) References Cited

U.S. PATENT DOCUMENTS

| | | | |
|---|---|---|---|
| 8,363,199 B2 | 1/2013 | Sekiya et al. | |
| 2005/0024575 A1* | 2/2005 | Kwak et al. | 349/153 |
| 2005/0062898 A1* | 3/2005 | Imayama et al. | 349/43 |
| 2007/0159094 A1* | 7/2007 | Oh et al. | 313/512 |
| 2010/0079718 A1* | 4/2010 | Sekiya et al. | 349/153 |
| 2010/0149477 A1* | 6/2010 | Nagami | 349/138 |

FOREIGN PATENT DOCUMENTS

| | | |
|---|---|---|
| JP | 2003-066465 A | 3/2003 |
| JP | 2010-091896 A | 4/2010 |

OTHER PUBLICATIONS

Official Communication issued in International Patent Application No. PCT/JP2011/075370, mailed on Nov. 29, 2011.

* cited by examiner

*Primary Examiner* — Lucy Chien
(74) *Attorney, Agent, or Firm* — Keating & Bennett, LLP

(57) ABSTRACT

A liquid crystal display panel 10 includes a first substrate 20 and a second substrate 40 facing each other; a liquid crystal layer 50 formed between the pair of substrates; and a sealing portion 60 located so as to surround the liquid crystal layer. An insulating film is formed on a surface of the first substrate which faces the liquid crystal layer. The insulating film has a stacking structure including at least an organic insulating film 33 and an inorganic insulating film 38 located on the organic insulating film. In a peripheral portion of the insulating film which surrounds the liquid crystal layer, an inorganic insulating film non-formed portion 35 in which the inorganic insulating film is not formed is provided. A surface of the sealing portion which faces the first substrate is entirely located in the inorganic insulating film non-formed portion and entirely adheres to the organic insulating film.

11 Claims, 5 Drawing Sheets

LIQUID CRYSTAL DISPLAY PANEL AND METHOD FOR PRODUCING THE SAME

TECHNICAL FIELD

The present invention relates to a liquid crystal display panel, and more specifically, to a structure of attaching a sealing portion for holding a liquid crystal layer formed between a pair of substrates.

The present application claims the benefit of priority based upon Japanese Patent Application No. 2010-253221 filed on Nov. 11, 2010, the entirety of which is incorporated herein by reference.

BACKGROUND ART

Recently, liquid crystal display devices including a liquid crystal display panel are in wide use as image display devices (displays) of TVs, personal computers and the like. Such a liquid crystal display panel is typically rectangular, and includes a pair of glass substrates (typically, an array substrate and a color filter (CF) substrate) bonded together with a sealing portion (sealing member) while having a prescribed gap therebetween, and a liquid crystal layer held between the pair of glass substrates. The liquid crystal layer has a liquid crystal material enclosed therein.

One type of substrate included in a liquid crystal display panel has a plurality of insulating films sequentially stacked on a surface thereof. For example, on a surface of such a substrate facing the liquid crystal layer, an inorganic insulating film is formed as an outermost layer, and an organic insulating film is formed, as a lower layer to the inorganic insulating film (in a direction away from the liquid crystal layer), in contact with the inorganic insulating film. When such a substrate is bonded by use of a sealing portion, the adhesiveness between the sealing portion and the inorganic insulating film is good. However, unless the adhesiveness between the inorganic insulating film and the organic insulating film is good, delamination may occur at an interface between the inorganic insulating film and the organic insulating film after the liquid crystal display panel is used for a long time, and as a result, the pair of substrates may be delaminated from each other. Conventionally, Patent Document 1 provides a technology for solving this problem. According to the technology described in Patent Document 1, a recessed portion which runs through the inorganic insulating film but does not run through the organic insulating film is formed in a part of the substrate in order to suppress the delamination of the substrates from each other.

CITATION LIST

Patent Document

Patent Document 1: Japanese Patent Laid-Open Publication No. 2010-91896

SUMMARY OF THE INVENTION

Technical Problem

However, with the above-described conventional technology, there is still a possibility that the inorganic insulating film and the organic insulating film are delaminated from each other and the liquid crystal display panel is poor in reliability, for the following reason. Although there is an area where a surface of the sealing portion which faces the substrate and the organic insulating film directly adhere to each other, the inorganic insulating film and the organic insulating film do not bond each other strongly in an area where the surface of the sealing portion which faces the substrate and the inorganic insulating film adhere to each other (lower layer).

The present invention made for solving the above-described problem of the conventional technology has an object of providing a highly reliable liquid crystal display panel in which delamination of the inorganic insulating film and the organic insulating film from each other is prevented to provide a sufficient adhesiveness between the substrates, and a method for producing the same.

Solution to the Problem

In order to achieve the above-described object, the present invention provides a liquid crystal display panel having the following structure. A liquid crystal display panel according to the present invention includes a first substrate and a second substrate which are a pair of substrates facing each other; a liquid crystal layer formed between the pair of substrates; and a sealing portion for holding the liquid crystal layer between the pair of substrates, the sealing portion being located between the pair of substrates so as to surround the liquid crystal layer. An insulating film is formed on a surface of the first substrate which faces the liquid crystal layer. The insulating film has a stacking structure including at least an organic insulating film and an inorganic insulating film located on the organic insulating film. In a peripheral portion of the insulating film which surrounds the liquid crystal layer, an inorganic insulating film non-formed portion in which the inorganic insulating film is not formed is provided. A surface of the sealing portion which faces the first substrate is entirely located in the inorganic insulating film non-formed portion and entirely adheres to the organic insulating film.

In the liquid crystal display panel provided by the present invention, the surface of the sealing portion which faces the first substrate is entirely located in the inorganic insulating film non-formed portion and entirely adheres to the organic insulating film.

According to this structure, the sealing portion is located in the inorganic insulating film non-formed portion which is formed so as to surround the liquid crystal layer, and the surface of the sealing portion which faces the first substrate and the organic insulating film adhere to each other along the entirety of the sealing portion. Therefore, delamination of the substrates from each other, which would be caused by delamination of the inorganic insulating film and the organic insulating film each other, is prevented effectively. Therefore, according to the present invention, a highly reliable liquid crystal display panel in which the substrates adhere to each other sufficiently can be provided.

In a preferable embodiment of the liquid crystal display panel disclosed herein, the sealing portion is located in a state where the surface thereof facing the first substrate is inserted into the inorganic insulating film non-formed portion, and side surfaces of the sealing portion and a part of the inorganic insulating film which is around the inorganic insulating film non-formed portion adhere to each other.

According to this structure, a part of the side surfaces of the sealing portion which is inserted into the inorganic insulating film non-formed portion adheres to, and is held by, the inorganic insulating film. Therefore, the reliability of the adhesion between this part and the first substrate is improved.

In another preferable embodiment of the liquid crystal display panel disclosed herein, a part of the organic insulating film which is in the inorganic insulating film non-formed portion is thinner than a part of the organic insulating film which is around the inorganic insulating film non-formed portion.

According to this structure, the surface of the sealing portion which faces the first substrate adheres to the organic insulating film, and also a part of the side surfaces of the sealing portion which is inserted into the inorganic insulating film non-formed portion partially adheres to the inorganic insulating film and partially adheres to the organic insulating film. Therefore, a highly reliable liquid crystal display panel in which delamination of the inorganic insulating film and the organic insulating film from each other is prevented can be provided. In still another preferable embodiment of the liquid crystal display panel disclosed herein, the first substrate is an array substrate including a plurality of thin film transistors.

Another aspect of the present invention provides a method for producing a liquid crystal display panel including a first substrate and a second substrate which are a pair of substrates facing each other; a liquid crystal layer formed between the pair of substrates; and a sealing portion for holding the liquid crystal layer between the pair of substrates, the sealing portion being located between the pair of substrates so as to surround the liquid crystal layer. Specifically, the method for producing the liquid crystal display panel disclosed herein includes forming an organic insulating film on a surface of the first substrate which faces the liquid crystal layer and forming an inorganic insulating film on the organic insulating film; removing the inorganic insulating film from the entirety of a peripheral portion thereof extending in a circumferential direction thereof and surrounding an area where the liquid crystal layer is to be formed, and thus exposing the organic insulating film, thereby forming an inorganic insulating film non-formed portion; and providing a sealing member for forming a sealing portion in the inorganic insulating film non-formed portion, thereby forming the sealing portion in the inorganic insulating film non-formed portion. In the production method disclosed herein, a surface of the sealing portion which faces the first substrate entirely adheres to the organic insulating film.

According to the method for producing a liquid crystal display panel of the present invention, the inorganic insulating film is removed from the entirety of a peripheral portion extending in a circumference direction thereof and surrounding an area where the liquid crystal layer is to be formed, and thus the organic insulating film is exposed. Thus, an inorganic insulating film non-formed portion is formed. The sealing portion is formed in the inorganic insulating film non-formed portion.

In this manner, the inorganic insulating film is removed from an area where the sealing portion is to be formed (i.e., area surrounding the liquid crystal layer) to expose the organic insulating film. Thus, the sealing portion can be formed such that the surface of the sealing portion which faces the first substrate entirely adheres to the organic insulating film directly. Owing to this, a highly reliable liquid crystal display panel can be produced in which the first substrate and the second substrate sufficiently adhere to each other.

DESCRIPTION OF EMBODIMENTS

Hereinafter, the present invention will be described by way of preferable embodiments with reference to the drawings. Elements which are other than elements specifically referred to in this specification and are necessary to carry out the present invention may be grasped as a matter of design choice for a person of ordinary skill in the art based on the conventional art. The present invention can be carried out based on the contents disclosed by this specification and the attached drawings, and the technological common knowledge in the art.

Figure 1:
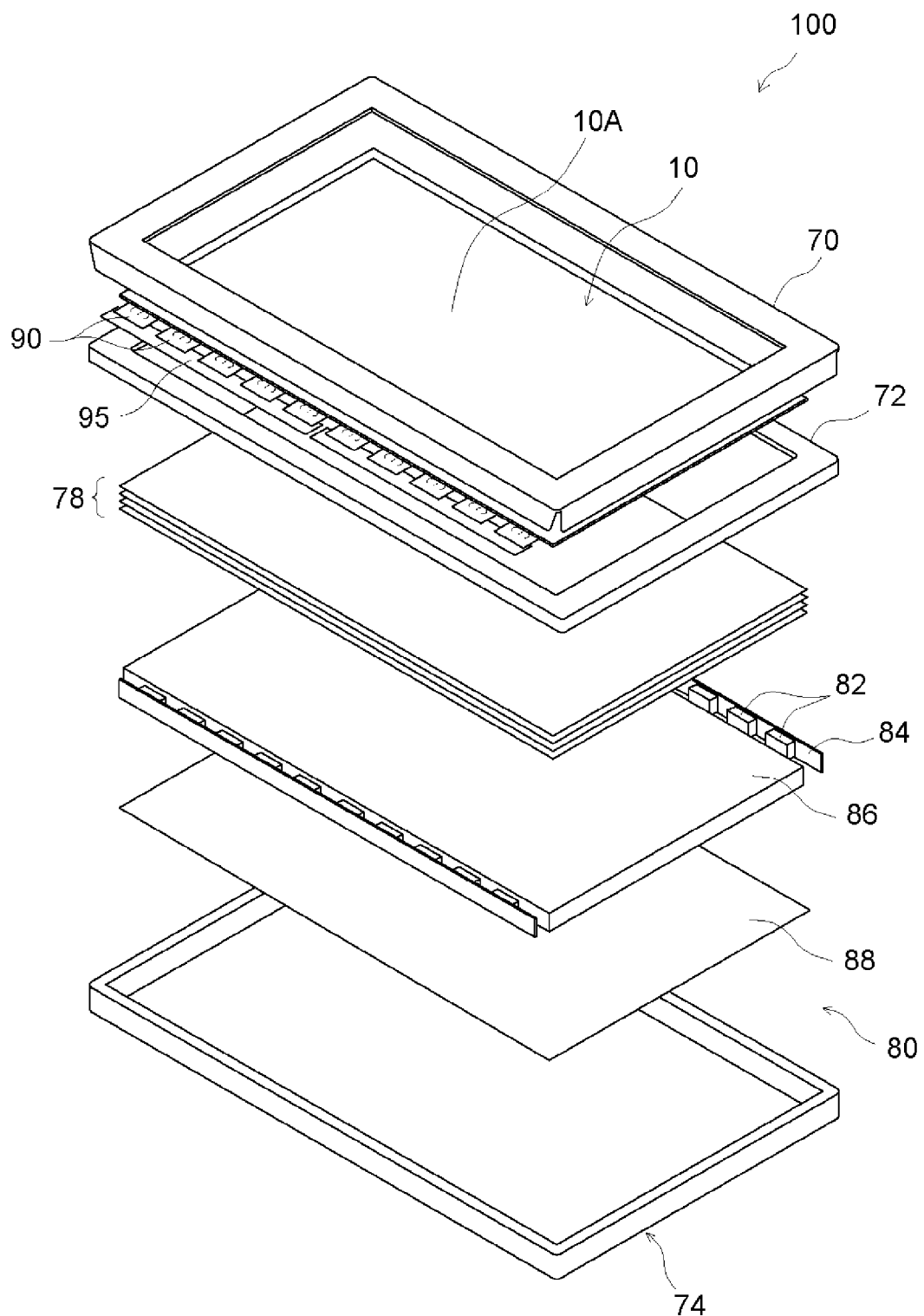
FIG. 1 is an exploded perspective view schematically showing a structure of a liquid crystal display device in an embodiment according to the present invention.
Figure 2:
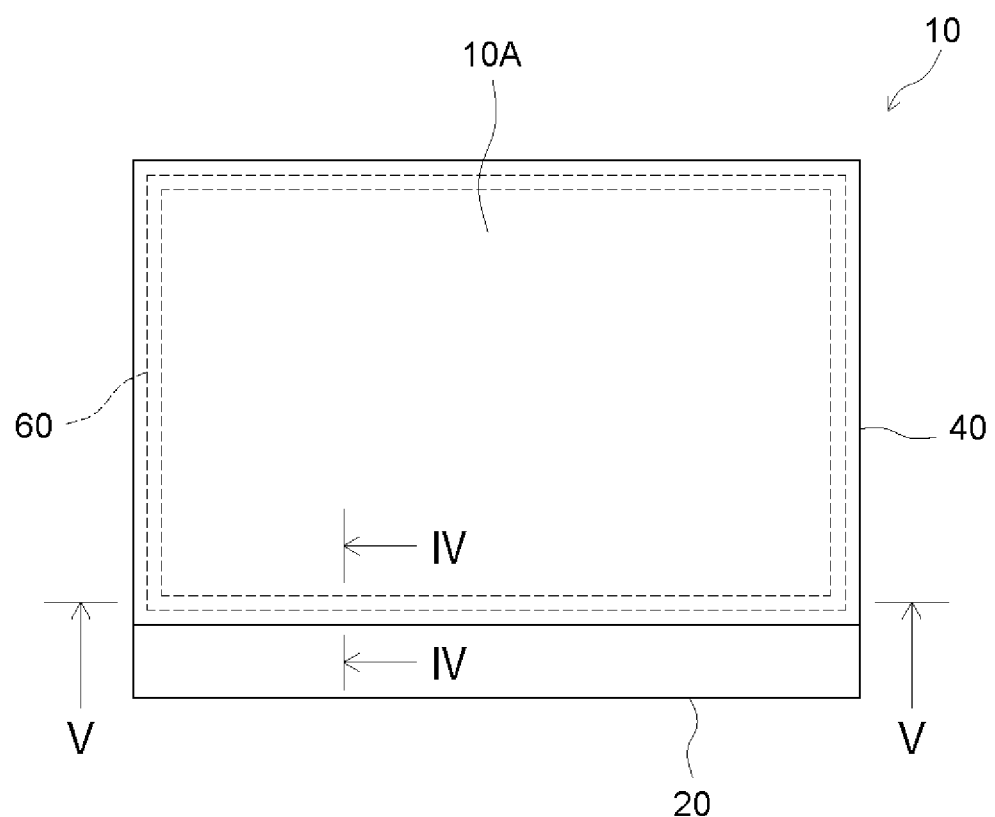
FIG. 2 is a plan view schematically showing a liquid crystal display panel in the embodiment according to the present invention.
Figure 3:
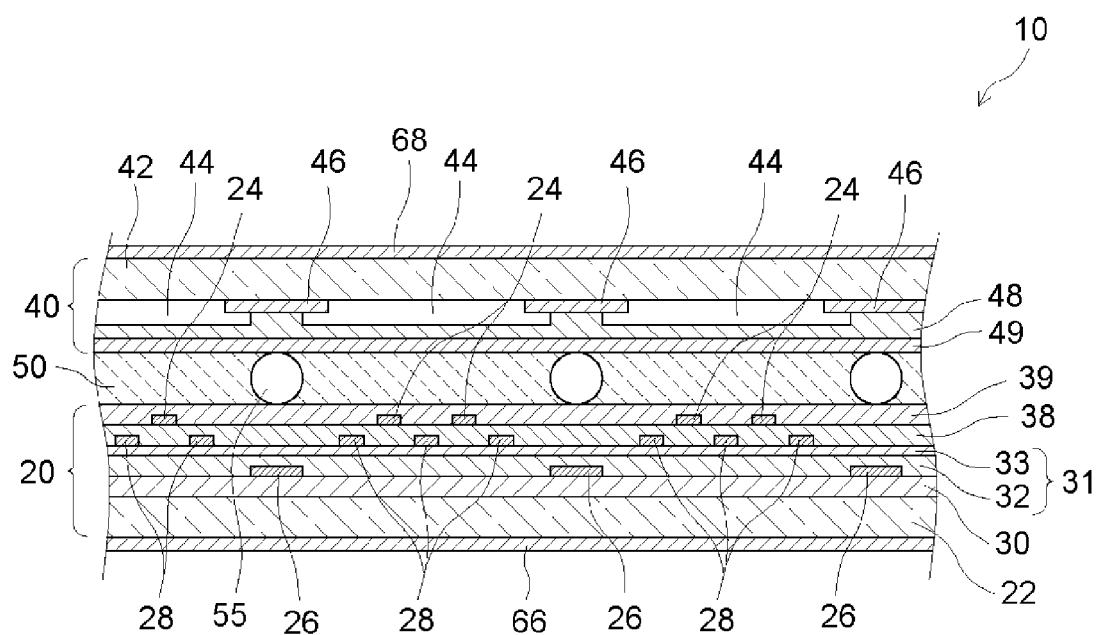
FIG. 3 is a cross-sectional view schematically showing a structure of the liquid crystal display panel in the embodiment according to the present invention.

Hereinafter, with reference to FIG. 1 through FIG. 3, a liquid crystal display panel 10 in a preferable embodiment (first embodiment) according to the present invention will be described. FIG. 1 is an exploded perspective view schematically showing a structure of a liquid crystal display device 100 in this embodiment. FIG. 2 is a plan view schematically showing the liquid crystal display panel 10 in this embodiment. FIG. 3 is a cross-sectional view schematically showing a structure of the liquid crystal display panel 10 in this embodiment. In the figures referred to below, members or portions having the same functions bear the same reference signs and descriptions thereof may be omitted or simplified. In the figures, the relative sizes (length, width, thickness, etc.) do not necessarily reflect the actual relative sizes. In the following description, the "front side" or "frontal side" means the side of the liquid crystal display device 100 facing the viewer (i.e., liquid crystal display panel 10 side), and the "rear side" or "reverse side" means the side of the liquid crystal display device 100 not facing the viewer (i.e., backlight unit 80 side).

First, an overall structure of the liquid crystal display device 100 will be described. As shown in FIG. 1, the liquid crystal display device 100 includes the liquid crystal display panel 10 and the backlight unit 80, which is an external light source located on the rear side of the liquid crystal display panel 10. The liquid crystal display panel 10 and the backlight unit 80 are assembled together by a bezel (frame) 70 or the like and thus are integrally held.

With reference to FIG. 2 and FIG. 3, the liquid crystal display panel 10 in this embodiment will be described. The liquid crystal display panel 10 has a generally rectangular overall shape, and includes a display area 10A in a central part thereof. The display area 10A has pixels formed therein and is provided for displaying an image. The liquid crystal display panel 10 includes a pair of light-transmissive glass substrates 20 and 40 facing each other and a liquid crystal layer 50 formed between the substrates. Among the pair of glass substrates 20 and 40, the substrate located on the reverse side is an array substrate 20, and the substrate located on the frontal side is a color filter substrate (CF substrate) 40. The CF substrate 40 is formed to have a smaller area size than that of the array substrate 20, and as shown in FIG. 2, is located so as to expose a peripheral portion of the array substrate 20.

On a surface of a peripheral portion of the CF substrate 40 which faces the array substrate 20, a sealing portion 60 is located so as to surround the display area 10A. A liquid crystal material containing liquid crystal molecules is enclosed in the area surrounded by the sealing portion 60, and thus the liquid crystal layer 50 is formed.

The array substrate 20 and the CF substrate 40 of the liquid crystal display panel 10 in this embodiment will be described in detail. The two substrates 20 and 40 have substantially the same structure as the structure of the substrates of a general liquid crystal display panel except for the structure of the sealing portion 60 located so as to surround the display area 10A and the vicinity thereof.

On the front side of the array substrate 20 (i.e., side facing the CF substrate 40 and adjacent to the liquid crystal layer 50), in the display area 10A, an array of pixels (more strictly, sub pixels) is formed, and a plurality of source lines 26 and a plurality of gate lines 29 (see FIG. 4) for driving the pixels (sub pixels) are formed in a lattice pattern. A pixel (sub pixel) is the minimum unit of providing display. Between each pair of gate lines 29 adjacent to each other, a common line (not shown) is formed parallel to the gate lines 29. In each of lattice areas (pixel areas) surrounded by the source lines 26 and the gate lines 29, a switching device (e.g., thin film transistor (TFT); not shown) which is driven by a signal (scanning signal) from the corresponding gate line 29 is formed. In each of the lattice areas, common electrodes 28 extending from the common line in a perpendicular direction thereto and parallel to each other are formed. Between the common electrodes 28, a pixel electrode 24 is formed parallel to the common electrodes 28. The pixel electrode 24 is supplied with a signal (video signal) from the corresponding source line 26 via the switching device at a prescribed timing. The common electrodes 28 are each supplied with a signal (reference signal), acting as a reference for the video signal, via the common line. The liquid crystal layer 50 is driven by a lateral electric field generated between the pixel electrode 24 and each common electrode 28.

As shown in FIG. 1, flexible printed circuits (FPCs) 90 are provided in a peripheral portion of the array substrate 20. Each FPC 90 has IC chips (driver IC chips; not shown) mounted thereon. The IC chips are provided for driving the liquid crystal display panel 10. One of two ends of each FPC 90 of this structure is secured to the peripheral portion of the array substrate 20, so that the FPC 90 is connected to the electrodes in the liquid crystal display panel 10 (pixel electrode 24, common electrode 28, and the like). The other end of each FPC 90 is attached to a printed circuit board (wiring board) 95, into which a controller for controlling the driver ICs (chips), other electronic components and the like are incorporated.

Now, a cross-sectional structure of the array substrate 20 will be described in detail. As shown in FIG. 3, on a substrate main body (glass substrate) 22 of the array substrate 20, the gate lines 29 (see FIG. 4) are formed. A gate insulating film 30 formed of an inorganic insulating film is provided so as to cover the gate lines 29. The insulating film 30 acts as a gate insulating film 30 in an area where the thin film transistors (switching devices) are formed.

On the gate insulating film 30, the source lines 26 are formed. A protective film 31 is formed so as to cover the source lines and the thin film transistors. The protective film 31 has a stacking structure including, for example, an inorganic insulating film 32 for covering the source lines 26 and an organic insulating film 33 formed on the inorganic insulating film 32. A polymer material used to form the organic insulating film is, for example, a siloxane-based resin, an acrylic resin or the like.

On the protective film 31 (i.e., on the organic insulating film 33), the common electrodes 28 extending from the common lines and parallel to each other are formed. An interlayer insulating film 38 formed of an inorganic insulating film (e.g., silicon nitride film or the like) is provided so as to cover the common electrodes 28. The common electrodes 28 are formed of, for example, ITO (Indium Tin Oxide).

On the interlayer insulating film 38, the pixel electrode 24 is formed in each lattice area (pixel area). The pixel electrode 24 is formed of, for example, ITO. On a surface of the pixel electrodes 24, an alignment film 39 formed of polyimide or the like is provided so as to cover the pixel electrodes 24. A surface of the alignment film 39 (i.e., surface thereof in contact with the liquid crystal layer 50) is subjected to alignment treatment (e.g., rubbing treatment, optical alignment treatment, or the like) in order to determine the alignment of the liquid crystal molecules when no voltage is applied thereto.

As shown in FIG. 3, on a substrate main body (glass substrate) 42 of the CF substrate 40, color filters 44 each of which has one of colors of R (red), G (green), B (blue) and Y (yellow) are formed in the display area 10A. Each color filter is formed in an area corresponding to each pixel area of the array substrate 20. Each sub pixel is associated with one of the colors of R, G, B and Y. A black matrix (light blocking film) 46 is also formed on the substrate main body 42 for demarcating the color filters 44 and preventing light from leaking through gaps between the sub pixels, for the purpose of improving the contrast and preventing mixture of the colors. The black matrix 46 and the color filters 44 are covered with a flattening film 48 formed of, for example, a resin. On an area of the flattening film which corresponds to the display area 10A, an alignment film 49 is formed. A surface of the alignment film 49 is subjected to alignment treatment (by substantially the same method as the alignment film 39).

As shown in FIG. 3, in the liquid crystal layer 50, a plurality of spherical or cylindrical spacers 55 (spherical in FIG. 3) are located in a dispersed manner as being held between the substrates 20 and 40. The spacers 55 are provided in order to cause the liquid crystal layer 50 to have a certain thickness (i.e., in order to provide a certain gap between the array substrate 20 and the CF substrate 40). The spacer 55 is formed of, for example, an elastically deformable resin material. Owing to this, the gap between the substrates 20 and 40 is maintained by the sealing portion 60 (see FIG. 2) and the spacers 55, and thus the thickness of the liquid crystal layer 50 is kept at a certain level.

As shown in FIG. 3, to surfaces of the substrates 20 and 40 not facing each other, polarizing plates 66 and 68 are bonded.

Figure 4:
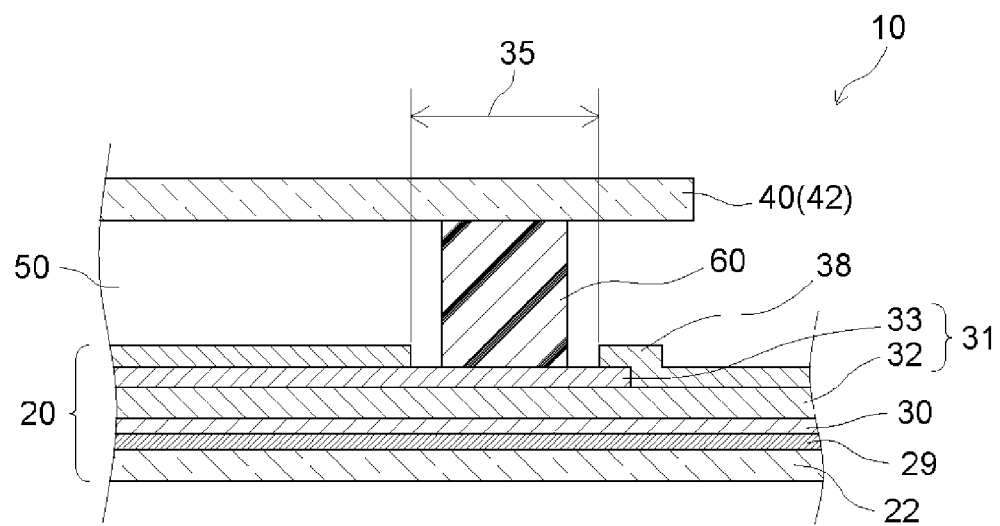
FIG. 4 is a cross-sectional view taken along line IV-IV in FIG. 2, which schematically shows a peripheral portion of the liquid crystal display panel.
Figure 5:
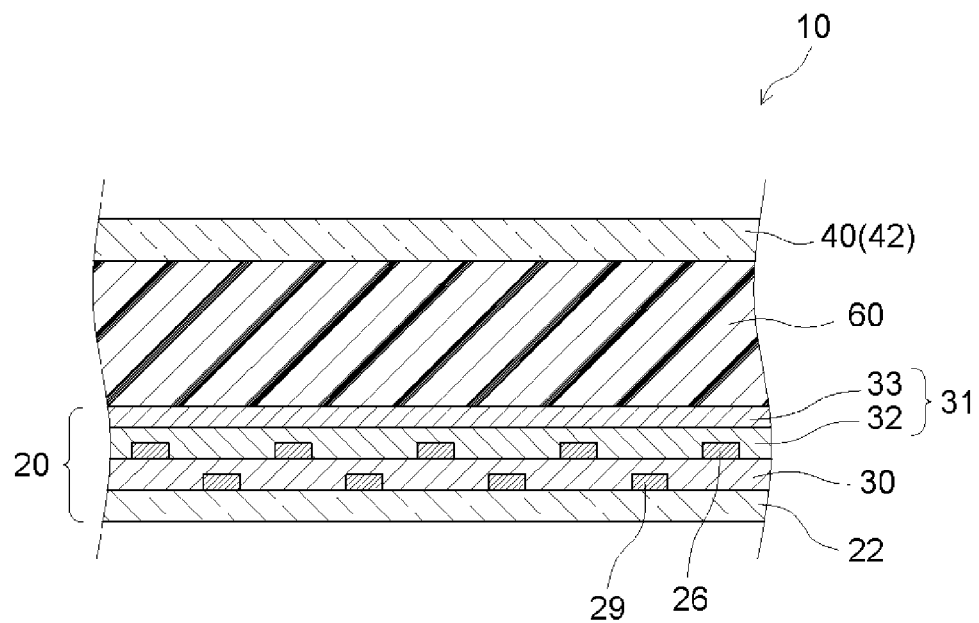
FIG. 5 is a cross-sectional view taken along line V-V in FIG. 2, which schematically shows a peripheral portion of the liquid crystal display panel.

Now, with reference to FIG. 4 and FIG. 5, a structure of the peripheral portion of the liquid crystal display panel 10 in this embodiment having the above-described structure will be described. FIG. 4 and FIG. 5 omit the black matrix 46 and the like formed in the CF substrate 40 for the sake of simplicity.

As shown in FIG. 4, the array substrate 20 has an inorganic insulating film non-formed portion 35 in a part thereof facing the CF substrate 40, more specifically, along the sealing portion 60 in the entire circumference thereof. In the inorganic insulating film non-formed portion 35, the interlayer insulating film 38 is not formed and the organic insulating film 33 formed below the interlayer insulating film 38 is exposed. The sealing portion 60 for enclosing the liquid crystal layer 50 held between the two substrates 20 and 40 of the liquid crystal display panel 10 is formed between the substrates 20 and 40 and is located in the inorganic insulating film non-formed portion 35. As shown in FIG. 4 and FIG. 5, a surface of the sealing portion 60 which faces the array substrate 20 is entirely in direct contact with the organic insulating film 33. The sealing portion 60 may be formed of a sealing member which is formed of a material that can adhere to the organic insulating film 33 and prevent leak of the liquid crystal material from the liquid crystal layer 50 for a long time. As such a material, any material usable for a sealing portion of a general liquid crystal display panel may be used with no specific limitation. For example, thermosetting resin materials and photocurable resin materials (typically, ultraviolet-curable resin materials) are usable.

In the case where the surface of the sealing portion 60 which faces the array substrate 20 entirely or partially adheres to the interlayer insulating film 38, there is a possibility that the interlayer insulating film 38 and the organic insulating film 33 are delaminated from each other below the surface of the sealing portion 60 which faces the array substrate 20, because the interlayer insulating film 38 and the organic insulating film 33 do not adhere to each other strongly. However, in the case where the surface of the sealing portion 60 which faces the array substrate 20 entirely adheres to the organic insulating film 33 directly, delamination of the substrates 20 and 40 from each other, which would be caused by the delamination of the interlayer insulating film 38 and the organic insulating film 33 from each other, is suppressed. Thus, the liquid crystal display panel 10 in which the substrates 20 and 40 enclose the liquid crystal layer 50 effectively and are connected to each other with an improved reliability can be provided.

In the liquid crystal display device 100 including the liquid crystal display panel 10 as described above, the bezel 70 is attached to the frontal side of the liquid crystal display panel 10 as shown in FIG. 1. A frame 72 is attached to the reverse side of the liquid crystal display panel 10. The bezel 70 and the frame 72 support the liquid crystal display panel 10 as holding both of two surfaces thereof. The frame 72 has an opening in an area corresponding to the display area 10A of the liquid crystal display panel 10. The backlight unit 80 having an accommodating chassis (also referred to as a backlight chassis or a case) 74 is provided on the reverse side of the liquid crystal display panel 10.

As shown in FIG. 1, the backlight unit 80 includes a plurality of light sources (e.g., LEDs, linear fluorescent tubes (typically, cold-cathode fluorescent tubes) etc.) 82, a lightguide plate 86 for converting light from the light sources 82 into planar light, and the chassis 74 for accommodating these elements. The light sources 82 are located on a wiring board 84 and are covered with a reflector (reflective film; not shown) such that the light from the light sources 82 are incident on the lightguide plate 86 highly efficiently. The chassis has a box-like shape which is opened toward the frontal side. Between the lightguide plate 86 and the chassis 74, a reflective sheet 88 for reflecting the light from the light sources 82 toward the viewer efficiently is provided.

On the frontal side of the lightguide plate 86, a plurality of optical sheets 78 in the form of sheets are stacked and located so as to cover the lightguide plate 86. The optical sheets 78 are, for example, a diffuser, a diffusion sheet, a lens sheet and a luminance increasing sheet which are located sequentially in this order from the backlight unit 80 side. The optical sheets 78 are not limited to being this combination of elements or being located in this order. The chassis 74 is further provided with a frame 30 having a generally frame-like shape in order to hold the optical sheets 78 in a state where the optical sheets 78 are fit into the chassis 74. On the reverse side of the chassis 74, an inverter circuit board (not shown) on which an inverter circuit is to be mounted and an inverter transducer (not shown) as a booster circuit for supplying power to each of the light sources 82 are provided. These elements do not characterize the present invention and thus will not be described.

Now, with reference to FIG. 3 and FIG. 4, a preferable example of a method for producing the liquid crystal display panel 10 in this embodiment will be described.

A method of forming switching devices (typically, TFTs) on the substrate main body (glass substrate) 22 to produce the array substrate 20 may be substantially the same as the conventional method. According to a preferable example of the method, photolithography is adopted. According to such a method, first, a metal film for gate lines (gate electrodes) 29 is formed on a surface of the substrate main body 22, and a photosensitive agent (resist) is applied thereto. A mask having a pattern of an electronic circuit is provided thereon (mask alignment) and is irradiated with light (typically, ultraviolet light) to expose the substrate main body 22. Then, the exposed substrate 22 is developed, and etching is performed along the pattern formed by the development. Thus, the gate lines 29 are formed. Next, the gate insulating film 30 formed of a nitride, an oxide or the like of silicon is formed over the gate lines. On the gate insulating film 30, the source lines 26, the inorganic insulating film 32 for covering the source lines 32, the organic insulating film 33, the transparent common electrodes 28, the interlayer insulating film 38 for covering the common electrodes 28, and the transparent pixel electrodes 24 are sequentially formed (stacked). The source lines 26, the common electrodes 28 and the pixel electrodes 24 may each be formed by performing the substantially the same process as the process for producing the gate lines 29.

Next, an alignment film forming material is applied over the pixel electrode 24 in an area corresponding to the display area by, for example, an inkjet method. Then, alignment treatment (e.g., rubbing treatment, optical alignment treatment) is performed in order to control the alignment of the liquid crystal molecules. Thus, the alignment film 39 is formed.

After the alignment film 39 is formed, the interlayer insulating film 38 is removed from the entirety of a peripheral portion thereof extending in a circumferential direction thereof and surrounding the area where the liquid crystal layer 50 is to be formed (i.e., a non-display area surrounding the display area 10A; the uppermost layer of the non-display area (i.e., layer farthest from the substrate main body 22) is the interlayer insulating film 38) by etching to form the inorganic insulating film non-formed portion 35, in which organic insulating film 33 is exposed. In this manner, the array substrate 20 is produced.

A method for producing the CF substrate 40 may also be substantially the same as the conventional method. According to a preferable example of the method, photolithography is adopted like the method for producing the array substrate 20. According to such a method, first, the black matrix 46 which is to act as a frame surrounding the color filters 44 of the above-mentioned colors is formed by photolithography in a lattice pattern on the substrate main body (glass substrate) 42. Next, for example, an R (red) pigment-dispersed resist is uniformly applied to the substrate main body 42 having the black matrix 46 formed thereon in the display area 10A, and then a mask alignment and exposure process is performed to print a pattern of the R color filter 44. Next, development is performed to form the R color filter of a prescribed pattern. G (green) and B (blue) color filters are formed in substantially the same manner. Then, the flattening layer 48 is formed on the color filters 44 and the black matrix 46 by, for example, sputtering. The method for forming the alignment film 49 on the flattening layer 48 may be substantially the same as the method for forming the alignment film 39 in the array substrate 20. In this manner, the CF substrate 40 is produced.

Next, the array substrate 20 and the CF substrate 40 are bonded together. Specifically, first, the sealing member (e.g., sealing adhesive formed of an ultraviolet-curable resin material) is provided in the inorganic insulating film non-formed portion 35 by, for example, a dispenser method (or a screen printing method). Then, the liquid crystal material is injected into the area surrounded by the sealing member by the dispenser method. Then, the array substrate 20 and the CF substrate 40 are assembled together such that the surfaces at which the alignment films 39 and 49 are formed face each other. The sealing member is irradiated with light (e.g., ultraviolet light) to be cured (provisional seal curing), and then is heated. Thus, the sealing portion 60 is formed. The sealing portion 60 thus formed is in the inorganic insulating film non-formed portion 35, and the surface of the sealing portion 60 which faces the array substrate 20 (substrate main body 22) entirely adheres to the organic insulating film 33. In this manner, the production of the liquid crystal display panel 10 is finished.

According to the method in this embodiment, the sealing portion 60 directly adheres to the organic insulating film 33. Therefore, the highly reliable liquid crystal display panel 10 can be produced, in which delamination of the substrates 20 and 40 from each other, which would be caused by delamination of the interlayer insulating film (inorganic insulating film) 38 and the organic insulating film 33 from each other, is suppressed.

Figure 6:
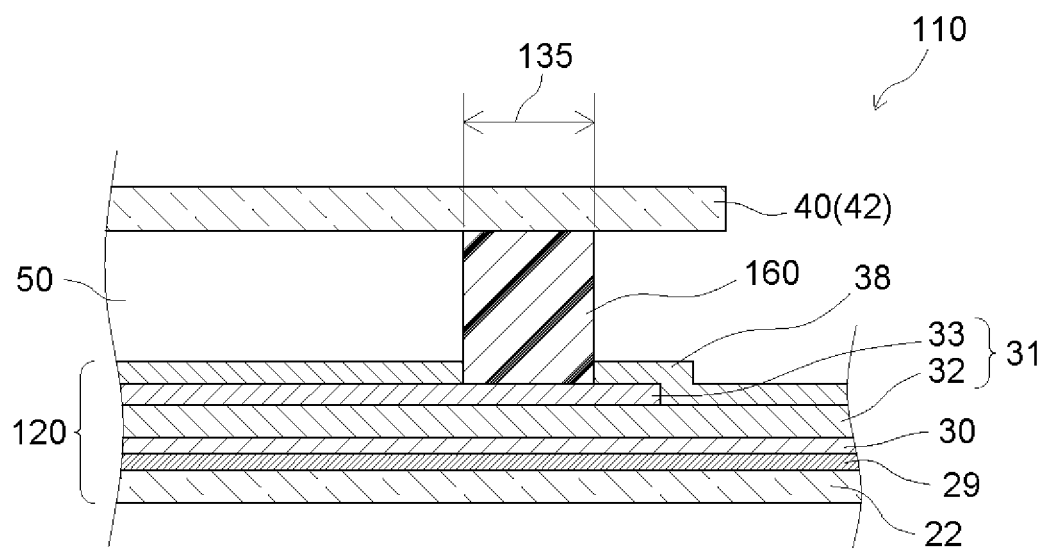
FIG. 6 is a cross-sectional view schematically showing a peripheral portion of a liquid crystal display panel in another embodiment according to the present invention.

Now, with reference to FIG. 6, a second embodiment will be described. FIG. 6 is a cross-sectional view schematically showing a peripheral portion of a liquid crystal display panel 110 in the second embodiment.

In the liquid crystal display panel 110 in this embodiment, a sealing portion 160 is located (formed) as being inserted into an inorganic insulating film non-formed portion 135, in which the organic insulating film 33 formed below the interlayer insulating film 38 is exposed. Namely, a surface of the sealing portion 160 which faces an array substrate 120 (substrate main body 22) entirely adheres to the organic insulating film 33, and also side surfaces of a bottom portion of the sealing portion 160 partially adhere to the interlayer insulating film (inorganic insulating film) 38 around the inorganic insulating film non-formed portion 135. Owing to this, the side surfaces of the sealing portion 160 are held by the inorganic insulating film 38. Thus, the reliability of the adhesion of the sealing portion 160 on the side of the array substrate 20 is improved.

Figure 7:
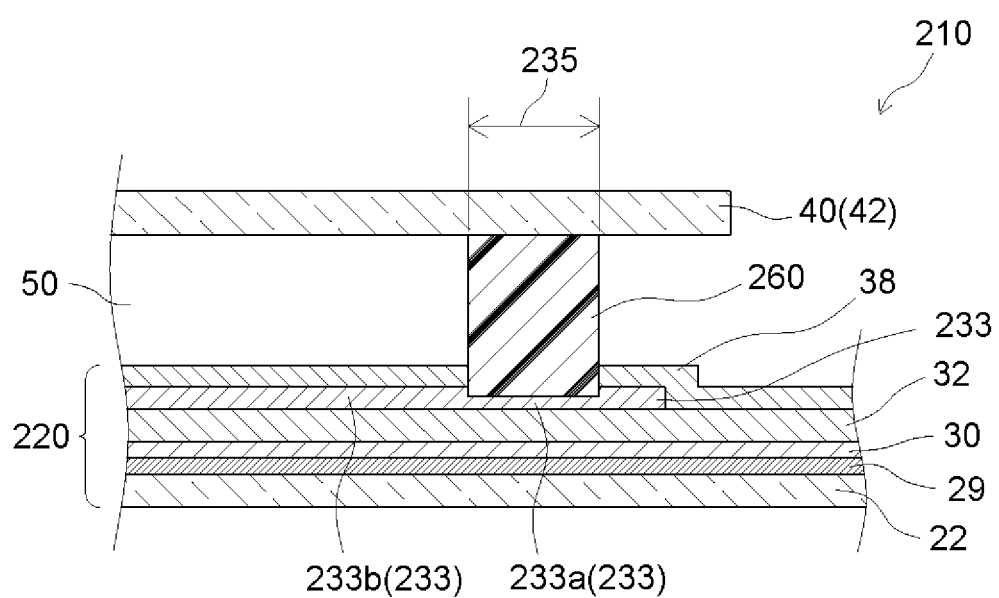
FIG. 7 is a cross-sectional view schematically showing a peripheral portion of a liquid crystal display panel in still another embodiment according to the present invention.

Now, with reference to FIG. 7, a third embodiment will be described. FIG. 7 is a cross-sectional view schematically showing a peripheral portion of a liquid crystal display panel 210 in the third embodiment.

In an array substrate 220 of a liquid crystal display panel 210 in this embodiment, the interlayer insulating film (inorganic insulating film) 38 is not formed in an area facing a peripheral portion of the CF substrate 40, and an inorganic insulating film non-formed portion 235 formed as a result of an organic insulating film 233 being partially removed is formed along the entirety (all circumferences) of a sealing portion 260. Namely, the organic insulating film 233 is formed such that an organic insulating film 233*a* in the inorganic insulating film non-formed portion 235 is thinner than an organic insulating film 233*b* around the inorganic insulating film non-formed portion 235.

The sealing portion 260 in this embodiment is located (formed) as being inserted into the inorganic insulating film non-formed portion 235. Namely, a surface of the sealing portion 260 which faces the array substrate 220 (substrate main body 22) entirely adheres to the organic insulating film 233 (233*a*), and also side surfaces of a bottom portion of the sealing portion 260 partially adhere to the organic insulating film 233 (233*b*) around the inorganic insulating film non-formed portion 235 and partially adhere to the interlayer insulating film (inorganic insulating film) 38. Owing to this, the highly reliable liquid crystal display panel 210, in which delamination of the organic insulating film 233 and the interlayer insulating film 38 from each other is prevented, is provided. The liquid crystal display panel 210 also has the effects of the second embodiment.

Hereinafter, an example according to the present invention will be described, but it is not intended to limit the present invention to the following example.

EXAMPLE

A liquid crystal display panel having substantially the same structure as that of the liquid crystal display panel 10 in the first embodiment was prepared. Specifically, substantially according to the method described above, an organic insulating film of an acrylic resin was formed on the array substrate, and an interlayer insulating film of silicon nitride ($SiN_x$) was formed on the organic insulating film. The interlayer insulating film was etched along the entire circumference thereof to expose the organic insulating film. Thus, an inorganic insulating film non-formed portion was formed. Then, a sealing member formed of an UV-curable acrylic resin was provided in the inorganic insulating film non-formed portion by a dispenser method, and the array substrate and the CF substrate were bonded together. The sealing member was cured, and thus a liquid crystal display panel was produced. In the liquid crystal display panel thus produced, a surface of the sealing member which faces the array substrate entirely adheres to the organic insulating film.

Comparative Example

A liquid crystal display panel having substantially the same structure as that of a liquid crystal display panel disclosed in example 1 of Japanese Patent Laid-Open Publication No. 2010-91896 was prepared. Specifically, according to the conventional method, an organic insulating film of an acrylic resin was formed on the array substrate, and an interlayer insulating film of silicon nitride ($SiN_x$) was formed on the organic insulating film. The interlayer insulating film was etched to expose a part of the organic insulating film. Then, a sealing member formed of an UV-curable acrylic resin was provided on the interlayer insulating film including the exposed part of the organic insulating film by a dispenser method, and the array substrate and the CF substrate were bonded together. The sealing member was cured, and thus a liquid crystal display panel was produced. In the liquid crystal display panel thus produced, a surface of the sealing member which faces the array substrate partially adheres to the organic insulating film. The area size in which the surface of the sealing portion facing the array substrate and the organic insulating film adhere to each other in the example is about 15 times as large as such an area size in the comparative example. The liquid crystal display panel in the example and the liquid crystal display panel in the comparative example have substantially the same structure except for the structure of an area of the insulating film where the sealing portion is formed.

Light-Up Test

A light-up test was performed on each of the liquid crystal display panels in the example and the comparative example produced above. Specifically, each liquid crystal display panel was operated for a prescribed time duration in a constant-temperature, constant-humidity tank set at a temperature of 50° C. and a relative humidity of 95%. Whether or not display nonuniformity occurred in the vicinity of the sealing portion of each liquid crystal display panel was checked. When no display nonuniformity occurred after the liquid crystal display panel was operated for the prescribed time duration, ○ was put in the table. When display nonuniformity occurred after the liquid crystal display panel was operated for the prescribed time duration, X was put in the table. The measurement results are shown in Table 1.

TABLE 1

|  | Time [h] | | | | | |
| --- | --- | --- | --- | --- | --- | --- |
|  | 0 [h] | 120 [h] | 250 [h] | 500 [h] | 750 [h] | 1000 [h] |
| Example | ○ | ○ | ○ | ○ | ○ | ○ |
| Comparative example | ○ | ○ | ○ | ○ | ○ | X |

Peel Strength Test

Now, the peel strength of the sealing portion of each of the liquid crystal display panels in the example and the comparative example was evaluated by use of a commercially available tensile tester.

The liquid crystal display panels in the example and the comparative example produced above were each secured to a stand of the tensile tester. The array substrate of each panel was secured so that the CF substrate was on the upper side in the vertical direction. The CF substrate was attached to a bottom end of a pulling jig, and the pulling jig was pulled up at a prescribed load. When the CF substrate and the array substrate were not delaminated from each other when the prescribed load was applied, ○ was put in the table. When the CF substrate and the array substrate were delaminated from each other when the prescribed load was applied, X was put in the table. The measurement results are shown in Table 2.

TABLE 2

|  | Load [N] | | | | | |
| --- | --- | --- | --- | --- | --- | --- |
|  | 4.9 [N] | 9.8 [N] | 14.7 [N] | 19.6 [N] | 24.5 [N] | 29.4 [N] |
| Example | ○ | ○ | ○ | ○ | ○ | ○ |
| Comparative example | ○ | ○ | ○ | ○ | X | — |

As shown in Table 1, in the liquid crystal display panel in the comparative example, display nonuniformity was confirmed to occur in the vicinity of the sealing portion at 1000 h. By contrast, in the liquid crystal display panel in the example, no display nonuniformity was confirmed to occur in the vicinity of the sealing portion even at 1000 h.

As shown in Table 2, in the liquid crystal display panel in the comparative example, it was confirmed that the CF substrate and the array substrate were delaminated from each other when being pulled up at a load of 24.5 N. By contrast, in the liquid crystal display panel in the example, it was confirmed that the CF substrate and the array substrate were in contact with each other without being delaminated when being pulled up at a load of 24.5 N. It was also confirmed that the substrates were not delaminated even when being pulled up at a load of 29.4N.

From the above-described measurement results, the liquid crystal display panel in the example was confirmed to prevent delamination of the CF substrate and the array substrate from each other and to be highly reliable.

So far, the present invention has been described in detail with reference to the drawings. The above description is merely exemplary and does not limit the scope of the claims. The technology described in the claims encompasses various modifications and alternations of the specific examples described above.

INDUSTRIAL APPLICABILITY

According to the liquid crystal display panel provided by the present invention, a surface of a sealing portion which faces the first substrate entirely adheres to the organic insulating film. Owing to this, delamination of the substrates from each other, which would be caused by delamination of the inorganic insulating film and the organic insulating film from each other, is prevented effectively. Therefore, the highly reliable liquid crystal display panel in which the substrates adhere to each other sufficiently can be realized.

DESCRIPTION OF REFERENCE SIGNS

10 Liquid crystal display panel
10A Display area
20 Array substrate
22 Substrate main body
24 Pixel electrode
26 Source line
28 Common electrode
29 Gate line
30 Gate insulating film (inorganic insulating film)
31 Protective film
32 Inorganic insulating film
33 Organic insulating film
35 Inorganic insulating film non-formed portion
38 Interlayer insulating film (inorganic insulating film)
39 Alignment film
40 Color filter substrate (CF substrate)
42 Substrate main body
44 Color filter
46 Black matrix
48 Flattening film
49 Alignment film
50 Liquid crystal layer
55 Spacer
60 Sealing portion
66, 68 Polarizing plate
70 Bezel (frame)
72 Frame
74 Chassis
78 Optical sheet
80 Backlight unit
82 Light source
84 Wiring board
86 Lightguide plate
88 Reflective sheet 90 Flexible printed circuit (FPC)
95 Printed circuit board
100 Liquid crystal display device
110 Liquid crystal display panel
120 Array substrate
135 Inorganic insulating film non-formed portion
160 Sealing portion
210 Liquid crystal display panel
220 Array substrate
233, 233a, 233b Organic insulating film
235 Inorganic insulating film non-formed portion
260 Sealing portion

The invention claimed is:

1. A liquid crystal display panel, comprising:
a first substrate and a second substrate which are a pair of substrates facing each other;
a liquid crystal layer formed between the pair of substrates; and
a sealing portion for holding the liquid crystal layer between the pair of substrates, the sealing portion being located between the pair of substrates so as to surround the liquid crystal layer; wherein:
an insulating film is formed on a surface of the first substrate which faces the liquid crystal layer;
the insulating film has a stacking structure including at least an organic insulating film and an inorganic insulating film in direct contact with the organic insulating film such that the organic insulating film and the inorganic insulating film are stacked, in this order, from the first substrate towards the liquid crystal layer;
in a peripheral portion of the insulating film which surrounds the liquid crystal layer, an inorganic insulating film non-formed portion in which the inorganic insulating film is not formed is provided; and
an entirety of a surface of the sealing portion which faces the first substrate is located in the inorganic insulating film non-formed portion and adhered to the organic insulating film.

2. The liquid crystal display panel according to claim 1, wherein the sealing portion is located in a state where the surface thereof facing the first substrate is inserted into the inorganic insulating film non-formed portion, and side surfaces of the sealing portion and a part of the inorganic insulating film which is around the inorganic insulating film non-formed portion adhere to each other.

3. The liquid crystal display panel according to claim 2, wherein a part of the organic insulating film which is in the inorganic insulating film non-formed portion is thinner than a part of the organic insulating film which is around the inorganic insulating film non-formed portion.

4. The liquid crystal display panel according to claim 1, wherein the first substrate is an array substrate including a plurality of thin film transistors.

5. A method for producing a liquid crystal display panel including:
a first substrate and a second substrate which are a pair of substrates facing each other;
a liquid crystal layer formed between the pair of substrates; and
a sealing portion for holding the liquid crystal layer between the pair of substrates, the sealing portion being located between the pair of substrates so as to surround the liquid crystal layer;
the method comprising:
forming an organic insulating film on a surface of the first substrate which faces the liquid crystal layer and forming an inorganic insulating film on the organic insulating film such that the inorganic insulating film is in direct contact with the organic insulating film and the organic insulating film and the inorganic insulating film are stacked, in this order, from the first substrate towards the liquid crystal layer;
removing the inorganic insulating film from the entirety of a peripheral portion thereof extending in a circumferential direction thereof and surrounding an area where the liquid crystal layer is to be formed, and thus exposing the organic insulating film, thereby forming an inorganic insulating film non-formed portion; and
providing a sealing member, for forming a sealing portion, in the inorganic insulating film non-formed portion, thereby forming the sealing portion in the inorganic insulating film non-formed portion; wherein
an entirety of a surface of the sealing portion which faces the first substrate is adhered to the organic insulating film.

6. The liquid crystal display panel according to claim 1, wherein an end portion of the organic insulating film is located between the sealing portion and an end portion of the first substrate.

7. The liquid crystal display panel according to claim 6, wherein the inorganic insulating film is located between the sealing portion and the end portion of the first substrate.

8. The liquid crystal display panel according to claim 6, wherein the organic insulating film is overlapped by the inorganic insulating film.

9. The method for producing a liquid crystal display panel according to claim 5, wherein an end portion of the organic insulating film is located between the sealing portion and an end portion of the first substrate.

10. The method for producing a liquid crystal display panel according to claim 9, wherein the inorganic insulating film is located between the sealing portion and the end portion of the first substrate.

11. The method for producing a liquid crystal display panel according to claim 9, wherein the organic insulating film is overlapped by the inorganic insulating film.

* * * * *